United States Patent
King et al.

(10) Patent No.: US 8,123,956 B2
(45) Date of Patent: Feb. 28, 2012

(54) CONTROL SYSTEM

(75) Inventors: Joseph A. King, Wayzata, MN (US); Mark Snetting, Eden Prairie, MN (US); Jeffrey D. Johnson, Minneapolis, MN (US)

(73) Assignee: King Technology, Hopkins, MN (US)

( * ) Notice: Subject to any disclaimer, the term of this patent is extended or adjusted under 35 U.S.C. 154(b) by 401 days.

(21) Appl. No.: 12/387,840

(22) Filed: May 7, 2009

(65) Prior Publication Data

US 2009/0218296 A1    Sep. 3, 2009

Related U.S. Application Data

(63) Continuation-in-part of application No. 12/079,543, filed on Mar. 27, 2008, now Pat. No. 7,632,402, and a continuation-in-part of application No. 11/805,527, filed on May 23, 2007, now Pat. No. 7,641,791, and a continuation-in-part of application No. 12/069,237, filed on Feb. 9, 2008, now Pat. No. 7,811,448.

(51) Int. Cl.
*C02F 1/50* (2006.01)
*C02F 1/76* (2006.01)

(52) U.S. Cl. ........ 210/739; 210/749; 210/764; 210/138; 210/143; 210/167.11

(58) Field of Classification Search .................. 210/739, 210/743, 749, 753, 754, 755, 756, 764, 167.11, 210/138, 143

See application file for complete search history.

(56) References Cited

U.S. PATENT DOCUMENTS

| | | | | |
|---|---|---|---|---|
| 3,804,253 | A * | 4/1974 | Wellman et al. | 210/85 |
| 4,076,458 | A * | 2/1978 | Jones | 417/46 |
| 5,676,805 | A * | 10/1997 | Silveri | 204/212 |
| 5,759,384 | A * | 6/1998 | Silveri | 205/743 |
| 6,296,756 | B1 * | 10/2001 | Hough et al. | 205/744 |
| 7,452,456 | B2 * | 11/2008 | Birkbeck | 205/701 |
| 7,695,613 | B2 * | 4/2010 | Doyle et al. | 210/85 |
| 7,767,067 | B2 * | 8/2010 | Silveri | 204/406 |
| 7,799,234 | B2 * | 9/2010 | Dooley et al. | 210/752 |

* cited by examiner

*Primary Examiner* — Fred Prince
(74) *Attorney, Agent, or Firm* — Jacobson and Johnson LLC

(57) ABSTRACT

An interactive sanitizer controller/display pad and method for controlling and selecting a dispensing rate in a sanitizer dispensing system based on the time the system is in a periodic dispensing mode and for indicating when a sanitizing dispenser needs replacement.

20 Claims, 7 Drawing Sheets ical display.

CONTROL SYSTEM

CROSS REFERENCE TO RELATED APPLICATIONS

This application is a continuation in part of U.S. applications: Ser. No. 12/079,543 filed Mar. 27, 2008 Titled Control System (now U.S. Pat. No. 7,632,402); Ser. No. 11/805,527 filed May 23, 2007 Titled Control System (now U.S. Pat. No. 7,641,791) and Ser. No. 12/069,237 filed Feb. 9, 2008 Titled Control System (now U.S. Pat. No. 7,811,448).

FIELD OF THE INVENTION

This invention relates generally to sanitization delivery systems and methods and, more specifically, to a method of control and delivery of sanitizers in an existing water systems through interaction with a visual display.

STATEMENT REGARDING FEDERALLY SPONSORED RESEARCH OR DEVELOPMENT

None

REFERENCE TO A MICROFICHE APPENDIX

None

BACKGROUND OF THE INVENTION

Contained bodies of water where a person immerses himself or herself partly or wholly in the body of water can be found in swimming pools, spas, hot tubs, jetted tubs as well as other containers. Generally, the person immerses his or her body partially or wholly in the body of water in order to obtain the effects of the water. In order to make the body of water safe for human contact it is necessary to kill harmful microorganisms in the water, such as bacteria, which can be done by dispensing antibacterial materials into the water. These types of water characteristics can be referred to as water safety characteristics. In addition, from time to time other water characteristics of the body of water, such as water comfort characteristics are adjusted. For example, the water temperature may be changed or in some cases the pH of the water may be adjusted sometimes both for safety purposes and for the comfort of the water user.

In some types of systems at least one pump continually circulates the water in a container so as to provide a body of water with uniform water characteristics as well as to remove unwanted materials or debris from the water. During the circulation of the water dispensable materials, such as minerals or other ion yielding materials, can be controllable dispensed into the water through either inline dispensers or floating dispensers to control the microorganisms in the water. Other water characteristics such as water temperature can be controlled by a heating or cooling the water as it flows through a heat transfer unit. In either case the water characteristics whether safety or comfort characteristics can be changed to make the water suitable and safe for the user.

Water characteristics in the containers have been controlled by continually circulating water through the dispensable materials that are located in a dispenser. In these systems one controls the level of dispensable materials in the body of water by continually circulating the water through the dispenser with the size and number of openings in the dispenser limiting the amount of dispensable material released by limiting the rate of water flow flowing through the dispenser. One such system is shown in King Technology U.S. Pat. No. 7,052,615. Generally, the incremental control of the dispensing rates is determined by the number and the size of openings in the dispenser. Another type of disinfectant control is an activity-enhanced dispenser wherein an enhanced dispensing rate is obtained by the activity in the body of water. One such system is shown in King Technology, Inc. U.S. Pat. No. 7,147,770.

Still other dispensing systems such as on-demand systems dispense materials, such as chlorine, directly into the body of water when the level of dispensable material falls below an acceptable level. One such device is shown in U.S. Pat. No. 4,224,154. If the chlorine level in the pool drops below a minimum level a solenoid valve is actuated for a short period of time followed by a longer non-dispensing period of time to permit the dispensed material to disperse throughout the pool. Once the level of chlorine reaches the proper level the dispensing of chlorine to the swimming pool ceases.

Still other systems use cartridge dispensers that are located in a fluid feeder line with the cartridges being removed from the fluid feeder line to enable one to change or adjust the rate of dispersant of a halogen into the body of water.

The invention herein described can be used with or without a sensor and is well suited for general use in water systems of various types as well as for small recreational water systems such as found in swimming pools, spas, hot tubs, jetted tubs or the like either as original equipment item or as an after market item. The invention described herein is suitable for use in conjunction with existing flow area adjustable dispensers to provide greater incremental dispensing control as well as more precisely control the release of dispensable materials to better maintain the proper level of dispensable materials in the body of water without the user having to manually adjust the port size on the system dispensers when the dispensing rate needs to be changed.

SUMMARY OF THE INVENTION

A control system with an interactive sanitizer controller/display pad for interacting with a time-based controller operating on a cycle with a fixed period wherein the time-based controller regularly cycles a valve between a first condition and a second condition with the first condition dispensing a water characteristic affecting material and the second condition reducing or preventing the dispensing of the water characteristic affecting material.

The invention also includes a method of controlling or setting a level of a safety or comfort characteristic of a body of water by circulating water to and from a body of water through a valve and a dispensable material and selecting a portion of the dispensing cycle period that a valve should be in a first open condition and a further portion of the dispensing cycle the valve should be in a second condition to direct less water or no water through the dispenser and repeating the opening and closing of the valve during a subsequent dispensing cycle to maintain the water safety or water comfort characteristics of the body of water at an effective level with or without the aid of a sensor to control the level of the dispensable material.

The invention also includes the method of maintaining a water characteristic in a body of water, such as a spa, over a period of time by dispensing a water characteristic affecting material into the body of water and regularly interrupting the dispensing of the water characteristic affecting material into the body of water during the period of time to thereby maintain the water characteristic of the body of water by regularly limiting when an amount of the water characteristic affecting material is dispensed into the body of water.

The control system may further include a boost function that can be manually or automatically engaged when the level of dispensable materials available for safety or comfort control falls below a desired level.

A further feature of the invention is a control system that is responsive to input from control modules that include either a stand-alone display or to an input from an integrated container control system.

A feature of the invention include the use of a plurality of control modules wherein at least one of the dual control modules is a wireless dual control module.

Another feature of the invention is a interactive sanitizer controller/display pad having illuminated lights for setting dispensing rates and for indicating when a dispensing sanitizer needs replacement.

DESCRIPTION OF THE PREFERRED EMBODIMENT

Figure 1:
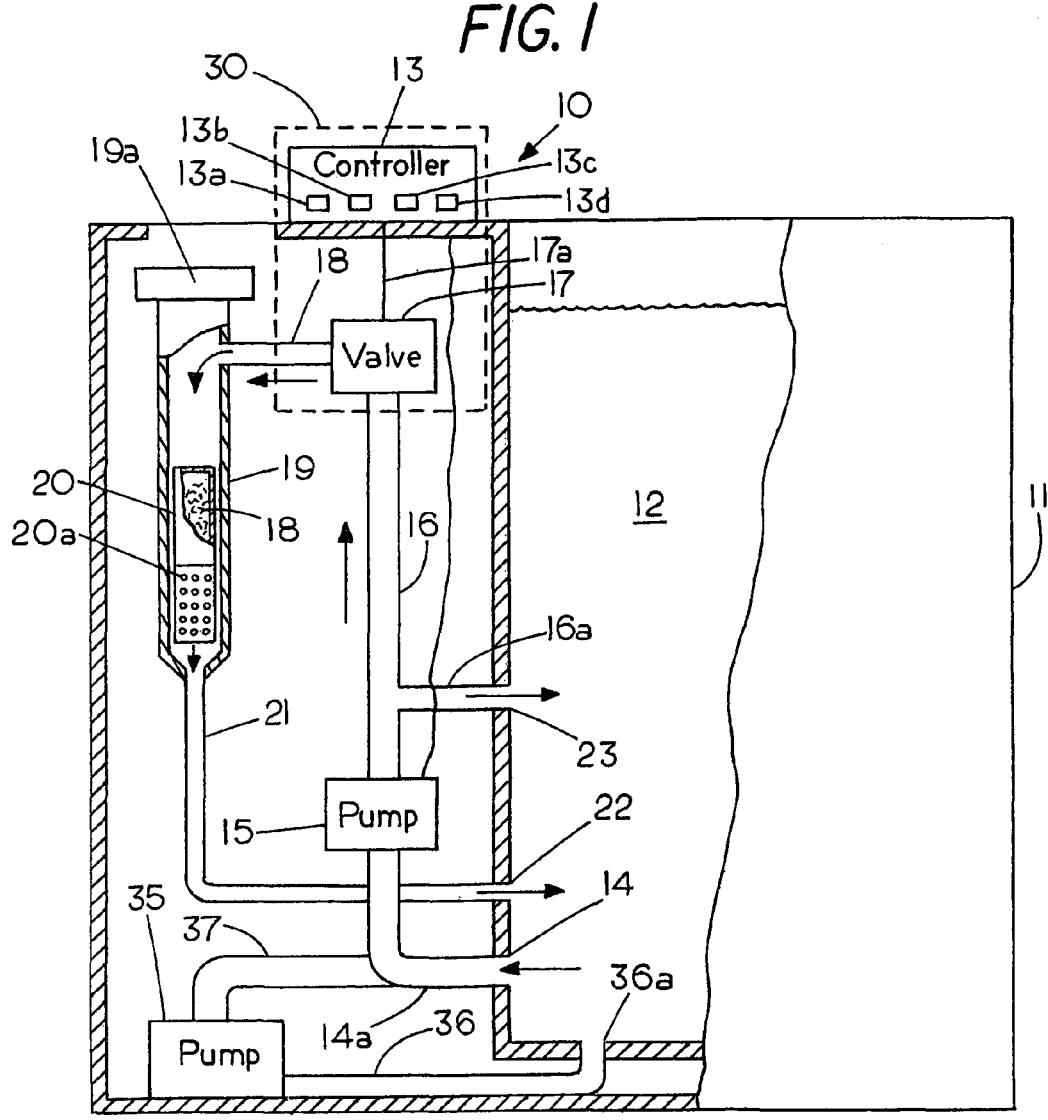
FIG. 1 is a partial cutaway view of a container having a control system.

FIG. 1 shows a partial cutaway view of a system 10, such as a hot tub or spa, with a container 11 having a water circulation system including a circulation pump 15, an inlet 14, an inlet line 14a, an outlet line 16 that circulates fluid to and from the body of water 12 in container 11 through a valve 17, a dispenser 19 and a return line 21 that discharges the water with a water characteristic affecting material such as a dispensable material therein. A second pump 35 circulates water from the body of water 12 through an inlet water line 37 and discharges the water under pressure through a nozzle 36a. The control system 10 includes a time-based controller 13 and an electrically controlled valve 17 that can be open or closed by an electrical signal. The time-based controller 13 operates on a regular cycle with a fixed time period wherein the time-based controller 13 repeatedly cycles the valve 17 between a first condition and a second condition. In the first condition water flows through a dispensable material during a first portion of the cycle and the second condition either a water flow lesser than in the first condition or no water flows through the dispensable material during the remaining portion of the cycle.

In the event the valve 17 is in a closed condition the pump 14 directs the water back into the body of water 12 through an underwater side discharge outlet 16a to thereby provide continued circulation of the body of water. By dispensing the dispensable material such as a halogen or silver chloride (not shown) located in the dispenser, which is shown in FIG. 1 to be a dispenser cartridge 20, into the circulating water one can bring the dispensable material in the dispenser 19 into the body of water 12 without having a dispenser in the body of water 12. A filter, (not shown), removes any debris from the water during the circulation process. This type of circulation system, while useable with all types of bodies of waters are particularly well suited for use with recreational bodies of water that are found in swimming pools, spas, hot tubs or other types of jetted tubs which humans immerse themselves partially or wholly therein.

Figure 1A:
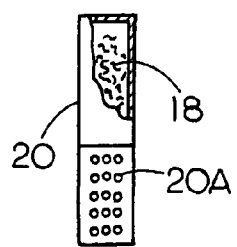
FIG. 1A is a partial cutaway view of the dispenser in the control system of FIG. 1.

FIG. 1A is a sectional view of dispenser 20 partially in section to reveal the dispensable material or water characteristic affecting material 18 located therein. Apertures 20 which can be opened or closed allow for limiting the flow of water into the dispenser 20.

The control system 30 is outlined in dashed lines in FIG. 1 and includes a controller 13 and a solenoid valve 17 that repeatedly receives a signal through line 17a to either open or close valve 17. When valve 17 is in a completely closed condition water is diverted away from dispenser 20 and flows through outlet 16a back into the body of water 12. When the valve 17 is in the open condition water flows through valve 17 and the dispensable material in dispenser cartridge 20 to dispense the dispensable materials into the body of water through the water line 21. Cycling the valve 17 between an open condition (for a first portion of a dispensing cycle) and a second condition (during a further portion of the dispensing cycle) where the valve 17 is completely closed is a preferred cycle. However, one can also cycle the valve 17 between an open condition and a second condition where the valve 17 is in partially closed condition thereby reducing the flow rate through the dispenser for the further portion of the cycle. It should be understood that the term valve herein is a device that one can use to control the flow of water into the dispenser 19. Controller 13 is a pulse width modulation system wherein the width of the output signal is varied to vary the duty cycle.

As pointed out in the background a number of existing systems control the level of dispensable materials in a body of water by continually circulating the water through a dispenser wherein the dispenser flow area limits the amount of dispensable material released. This is done by controlling the size or number of openings in the dispenser which in turn limits the amount of water flowing through the dispenser. Such systems are shown in King Technology U.S. Pat. Nos. 7,052,615 and 7,014,780.

Still other dispensing systems use sensors to control the dispensing of materials directly into the body of water when the level of dispensable material falls below an acceptable level. One such sensor driven dispensing system is shown in U.S. Pat. No. 4,224,154 wherein a sensor detects if the chlorine level is below a minimum level. If the chlorine is below a minimum level a solenoid valve is actuated for a short period of time followed by a longer non-dispensing period of time to permit the dispensed material to disperse throughout the pool before the chlorine level is checked again.

In contrast to the sensor driven on demand dispensing systems the invention herein can eliminate the need for a sensor to sense the level of dispensable material in the water yet the invention can still provide accurate control of the release of dispensed materials.

Figure 2:
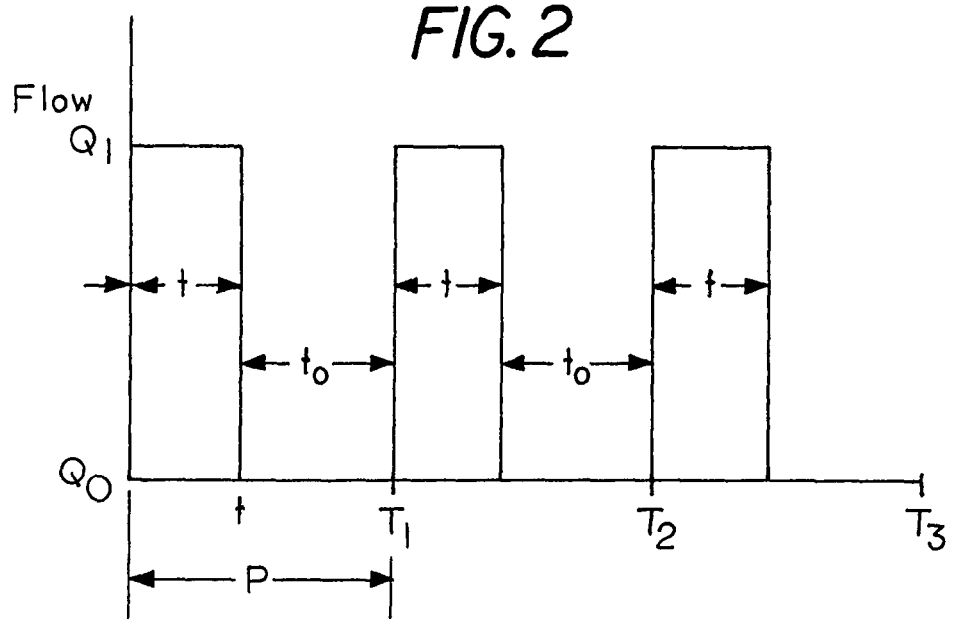
FIG. 2 is diagram of a cycle of the control system of FIG. 1.

FIG. 1 shows control system 10 includes a time based controller 13 and an electrically controlled solenoid valve 17 wherein the time-based controller repeatedly generates a signal that has a fixed period that cycles the valve 17 between a first condition and a second condition. During a first portion of a flow cycle the valve 17 directs water through a dispensable material and the remaining portion of the flow cycle the valve directs no water through the dispensable material. As an alternate to complete shut off of flow of water in the latter portion of the cycle one could direct some flow through the second portion of the cycle but less flow than through the first portion of the flow cycle. A reference to FIG. 2 illustrates a repeated on off cycle for dispensing materials wherein the system repeatedly goes from a flow condition to a non flow condition. That is, during a flow cycle the valve 17 goes from an open condition having flow rate $Q_1$ where water flows through the dispensable material to a closed condition having flow rate $Q_0$ where there is no water flow through the dispensable material. Once the period P is completed the flow cycle repeats itself. That is, at time $T_1$ the system completes one cycle and at time $T_2$ the system completes a second cycle and so on. By continually repeating the opening and closing of the valve 17 based solely on elapsed time one can maintain the safety or comfort characteristics of the body of water at an effective level without the aid of continuous feedback from sensors. However, if desired sensors with feedback can also be used in conjunction with the present control system. Thus, instead of gradually increasing or decreasing a continuous flow rate through the dispenser 20 to obtain the proper amount of dispensable materials in the body of water the system permits one to control the time and the amount of water that can flow through the dispensable materials to obtain the proper amount of dispensable materials in the body of water.

The method of the invention includes controlling a level of a safety or a comfort characteristic of a body of water by circulating water to and from a body of water 12 through a valve 17 and a dispenser 19 by selecting a period P for a flow cycle or dispensing cycle, then selecting a portion of the dispensing cycle period that valve 17 should be in an open condition "t" and a remaining portion "$t_o$" of the dispensing cycle period where the valve 17 should be in a second condition of lesser flow or a no flow condition. FIG. 2 illustrates that, during a cycle the valve 17 goes from an open condition $Q_1$ where water flows through the dispensable material to a closed condition $Q_0$ where there is no water flow through the dispensable material in dispenser cartridge 20. Once the period P is completed the dispensing cycle repeats itself. That is, at time $T_1$ the system 10 completes one cycle and at time $T_2$ the system completes a second cycle and so on. By continually repeating the opening and closing of the valve 17 based solely on elapsed time one can maintain the safety or comfort characteristics of the body of water at an effective level without the use of a sensor to provide feedback. Although if one so desired a sensor providing feedback can be used with the present method. In addition the method can include the step of changing the fractional on time by changing the portion of the dispensing cycle in the open condition and correspondingly changing the remaining portion of cycle in the closed condition to change the amount of dispensable material deliverable to the body of water without changing the period of the dispensing cycle. Also the step of changing the portion of the dispensing cycle in the open condition and correspondingly changing the remaining portion of cycle in the closed condition can be done on the go. The method can further include the step of changing a rate of dispensing materials from the dispenser by changing the flow area on a flow area controllable dispenser by changing a port size in the flow area controllable dispenser.

FIG. 1 shows the system can be used with circulation lines having a flow adjustable cartridge dispenser or cartridge 20 having flow adjustable ports 20a located in dispenser 19 or by having the dispensable material located in dispenser 19 without a cartridge 20 to hold the dispensable materials. When the system is used with a flow adjustable cartridge dispenser 20 the user can select a dispenser flow area by adjusting the open area of the ports 20a in the cartridge dispenser 20 based on the use of the body of water. For example, if two people use the spa three times a week it would require one port setting and if three people use the spa everyday it would require a different port setting. To set the cartridge dispenser to the proper flow area one generally removes cap 19a and the cartridge dispenser 20 from the dispenser 19 to adjust the flow openings. Generally, in these types of systems the water is continually circulated through the dispensable material and the flow area of ports 20a of the dispenser cartridge 20 can be changed to provide precise control.

The time-based system 10 with controller 13 can be used directly with the flow adjustable cartridge dispensers 20. In this type of control system wherein the time-based controller has a fixed period the time based controller 13 regularly cycles the valve 17 between a first condition and a second condition with the first portion of the cycle directing a first flow of water through a dispensable material and the remaining portion of the cycle directing a lesser flow of water or no water through the dispensable material. While FIG. 1 shows the circulation system located external to the body of water, if desired, the circulation system can be immersed directly in the body of water 12.

FIG. 2 illustrates a specific type of operation where the controller 13 is on for a time "$t_1$" and off for a time "$t_o$" during a time period P that typically lasts an hour or less. As can be seen in FIG. 2 the on off cycle repeats itself at regular intervals ($T_1$, $T_2$, $T_3$). The time "t" is on the horizontal axis and the amount of flow Q through the dispensable material is on the vertical axis. The cycle length is indicated by P and the fractional portion of the cycle length P wherein the flow is on is indicated by t and the remaining fractional portion of the cycle length P wherein no flow occurs is indicated by $t_o$. The on off cycle occurs during an elapsed time T and then the cycle repeats itself during a subsequent identical elapsed T. The time that the flow condition $Q_1$ occurs can be expressed as a percent of the total time for a cycle. For example, if the flow condition $Q_1$ is on for 10 minutes of a 50-minute cycle and off the remaining portion of the 50-minute cycle the on percentage would be 20% and the off percent would be 80%. The time period $T_1$ is followed by an identical time period $T_2$ which is then followed by identical time period $T_3$ and so on. Using the above example, during each time period the percentage where flow would be on is the same, namely, 20%. As a result the flow through the dispensable material in the dispenser 19 occurs at selected times during each period P. By adjusting the fractional amount of on time during a cycle one can intermittently deliver the dispensable materials to the body of water and can more accurately maintain the body of water with the proper amount of dispensable material. As a result dispensable material in dispenser 19 is periodically dispensed into the body of water 12 by the water periodically flowing through the dispenser 19 rather than being continually dispensed into the body of water by water continually flowing through the dispenser.

The length of the period P can be selected based on the type of application and in most instances a period P of less than an hour is preferred. This system 10 is also well suited for use with the flow adjustable cartridge or dispenser 20 shown in FIG. 1. When the controller 13 is used with a flow adjustable cartridge dispenser 20 one first selects the flow area of ports 20a in the dispenser cartridge 20. One then selects the period P and the times $t_1$ and $t_0$ deliver the proper amount of dispensable material to the body of water. The use of a controller 13 with a flow adjustable cartridge 20 provides two benefits, the first is that one can obtain a wider range of flow conditions through the cartridge 20 and the second is that one can obtain more precise incremental control of the flow rate through the cartridge 20 since the port size through the cartridge 20 can be changed even though the time the valve 17 is in the open condition and the time the valve is in the closed condition remains the same. In addition, one can change the output of a dispensing cartridge 20 without having to remove the dispenser cartridge 20 to adjust the port size. That is, the amount of dispensable material dispensed into the body of water can be increased by increasing the percentage of on time $t_1$ while correspondingly decreasing the remaining off time $t_0$ or vice versa. Also one can change the amount of dispensable material delivered to the body of water over a given period of time by changing the time of the flow through the dispenser, that is by shortening or lengthening the period P.

While the invention is suitable for use with systems that have a pump running continually, such as found in spa systems where the pump directs water over a heater, the system can also be used with other systems having a range of pump run times.

Figure 3:
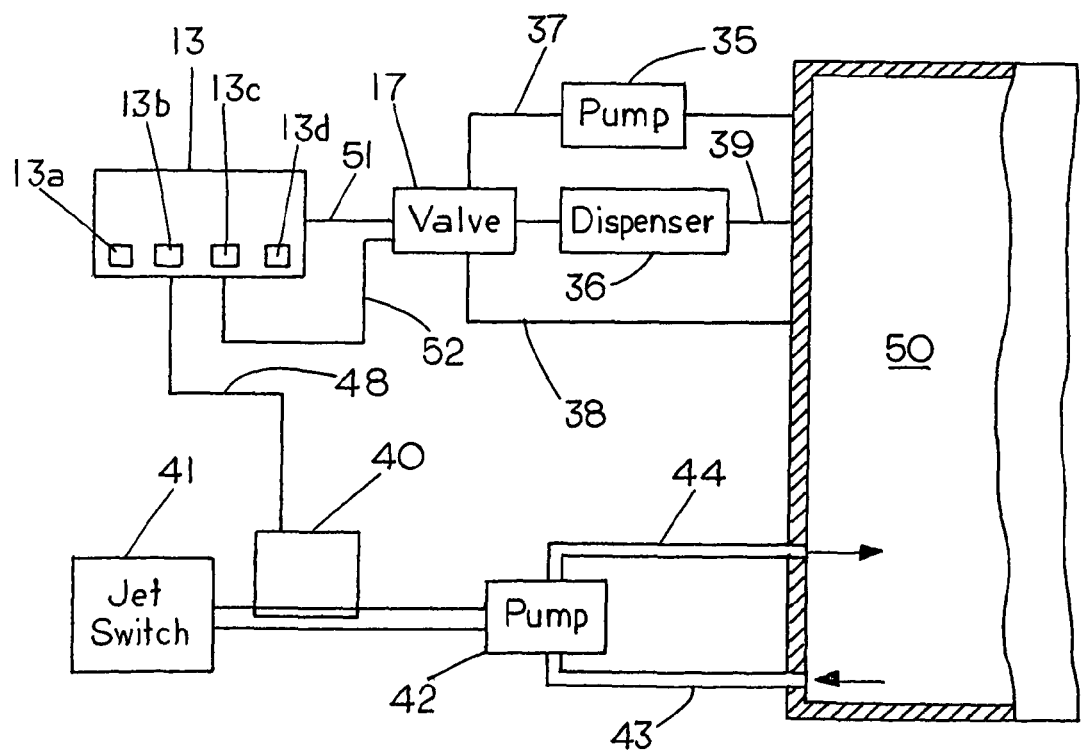
FIG. 3 is a schematic of a control system with an override.

Although the system functions effectively based solely on elapsed time, if desired, one can introduce an override or boost function into the system. FIG. 1 and FIG. 3 show the controller with controls 13a, 13b, 13c and 13d. Control 13a is a "boost" which can be used to override the valve close signal and keep the valve open for a longer time and therefore deliver more dispensable material to the body of water. That is, controller 10 can include a manual override 13a for overriding the controller cycle system that periodically changes the flow rate from flow rate $Q_1$ to flow rate $Q_0$. That is, the increase in delivery of more dispensable material can be obtained by maintaining the flow condition $Q_1$ while suppressing or preventing the second condition of no flow (flow rate $Q_0$) from occurring.

Another control 13b can be set to activate a different timed flow cycle based on a non-water characteristic of the water such as activity in the body of water. For example, the controller 13 can be set to monitor the operating time of the jet pump 35 that directs water into and around persons in a body of water such as a spa or the like. Since the length of time the jet pump operates is an indication of human activity in the tub and therefore an indication of increased bacteria levels in the tub one can use the jet pump operating time to automatically initiate a clean up cycle. That is, in response to a jet pump operating time exceeding a preset time the repeated cycling of the valve 17 can be overridden to allow water to continually flow through the dispensable material for an extended period of time to thereby bring the level of sanitizer or disinfectant up to the proper level. As a consequence the level of dispensable material released into the body of water is boosted for a period of time because the system has sensed the jet pump has been operating for an extended period of time. Once the boost cycle is completed the controller 13 reverts to the repeated cycling to maintain the level of dispensable materials at the proper level. Similarly, control 13c can be used to increase or decrease the length of the period P of the cycle and control 13d can be used to change the length of the on time t and the off time $t_0$ of the cycle. Thus the operator can, if desired, change the flow conditions and hence the amount of dispensable materials delivered to the body of water over a period of time by temporarily changing either the period P, the percentage of on time $t_1$ in a cycle or by simply overriding the cycle for a selected period of time. Thus, the system can include the step of monitoring a non-water characteristic such as monitoring an operational time of a jet pump and temporarily overriding the dispensing cycle to direct more flow through the dispensable material in response to the operational time of the jet pump.

Preferably, the cyclic controller 13 is set to have a cycle length of less than a day and generally less than an hour. For example, the cycle length can be set for forty minutes, which means the on off cycle will be repeated every forty minutes. Thus in a 24 hour day the cycle will occur 36 times. The duration of the on off cycle is fractionally selected. For example, during the cycle length P of forty minutes one can select solenoid valve 17 to be closed 35% (14 minutes) of the cycle length causing the valve to be open during 65% (26 minutes) of the cycle length. In the closed condition water is prevented from flowing through the dispenser 19 and in the open condition water is allowed to flow through the dispenser 19.

In contrast a system wherein the water is normally continually circulated through a dispenser the flow of water through the dispenser 19 therein is periodically interrupted by the cyclic opening and closing of the solenoid valve 17.

A further advantage of the present inventions is that it can be used with a dispenser cartridge that is flow adjustable to provide better control of the delivery rate of dispensing material. That is, the size and/or the number of open ports in the dispenser cartridge can be selected and fixed while the percentage of on time during a cycle is changed to thereby change the delivery rate of a dispensable material from the dispensing cartridge. By combining the selection of the size of the flow area through the dispenser cartridge with the amount of flow time through the dispenser cartridge one can more precisely control the dispensing of dispensable material into the body of water.

An example of such a dispenser where the flow area can be changed is shown in U.S. Pat. No. 7,059,540 and is hereby incorporated by reference.

FIG. 3 shows a block diagram of a controller 13 connected to various components of the spa 50. In the embodiment shown the controller 13 sends a signal through line 51 to open and close the solenoid valve 17. A pump 35 directs water into the valve 17 and through the dispenser 36 and into line 39 into the spa when the system is in the "on portion" of the cycle. When the system is on the "closed portion" of the cycle the water is delivered through line 38 back into spa 12 without flowing through the dispenser 36.

Located separate from circulation system for the control valve 17 is a jet pump 42 that is operated by a jet switch 41. That is when a person in the spa wants to direct a jet of water at himself or herself the jet switch 41 is activated which starts pump 42 which draws water through line 43. Pump 42 then directs the water in the form of a water jet back into the spa 50 through line 44. In this embodiment an amp hour meter or other type of monitor 40 can be used to measure the pump run time i.e. the length of time the pump 42 is in operation. The monitor or sensor 40 thorough line 48 sends the information on run time for pump 42 to controller 13, which compares the run time to a preset run time. If the run time exceeds the preset run time the controler 13 sends a signal to valve 17 to override the regular cycle and keep the valve 17 open for a longer time. For example, water can be allowed to flow through the dispenser 36 for 3 hours without any on off cycling of water through the dispenser 36. This continuous flow of water through the dispenser would allow the body of water to catch up to the need for increased dispensable material.

Figure 4:
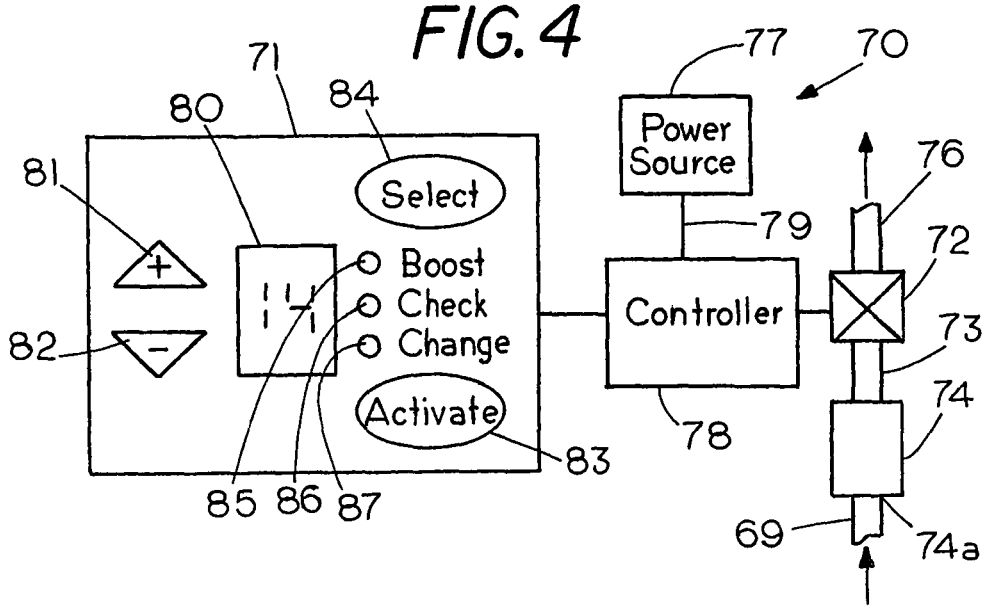
FIG. 4 is diagram of a control system with a stand-alone display and a valve that opens and closes a pipeline to a sanitizing dispenser.

FIG. 4 is diagram of a control system 70 with a control module comprising a stand-alone display 71 and a solenoid valve 72 that opens and closes a pipeline 73 from a dispenser 74 containing a dispensable material comprising a water characteristic affecting material such as a dispensable sanitizing material. Typically, dispensable sanitizing materials include such materials as chlorine, bromine, minerals, metals or the like that can sanitize a body of water by killing harmful organisms in the body of water. In operation, water, usually from a pump, is normally supplied to an inlet 74a of dispenser, 74. When valve 72 is in an open condition the water flows through the dispenser 74 thereby dispensing the dispensable material therein into the pipeline 76 that carries the water and the dispensable material to the body of water to adjust or affect the water characteristics of the body of water. In the embodiments shown a separate power source 77 supplies power to cyclic controller 78 through electrical lead 79. Controller 78 comprises a conventional pulse width modulation circuit therein wherein the width of the duty cycle of the output signal is varied to control the on or open time of valve 72.

The system 70 is capable of cyclical control of a water characteristic or water characteristics of a body of water, for example, a water characteristic such as the pH or the sanitizer level can be maintained or controlled with or without feedback of the water characteristic from the body of water. That is, on going measurement of the water characteristics of the body of water and then automatically updating the dispensing rate of a water characteristic material through continuous or intermittent feedback are unnecessary to maintain or control a water characteristic or water characteristics of body of water. The cyclic controller 78 can be responsive, i.e. set by either a stand-alone display 71 or a spa display. The cyclic controller 78 repeatedly generates a cyclic output signal having a first signal and a second signal with the first signal different than the second signal. FIG. 2 illustrates a typical signal wherein the pulse width is modulated to interrupt the dispensing of a water characteristic affecting material.

In the embodiment of FIG. 4 the stand alone display 71 includes a visual numerical display 80, a boost control 85, a check control 86 function such as check sanitizer, a change control feature which reminds a user to change minerals or sanitizers with a select button 84 for selecting of any of the above features. Once a feature is selected one activates the control feature by pushing activate button 83. In the embodiment shown the numerical display 80 displays the percentage of time the water flows through the system for every cycle. For example, the displayed numerical 14 indicates a 14% duty cycle. That is, the system is on 14% of the period P which means that with system 70 water flows through dispenser 74 14% of the time of each cycle. The display 71 further includes a plus switch that allows one to increase the percentage of time water flows through the dispenser 74 for every cycle and a minus switch where one can decrease the percentage of time that water flows through the dispenser 74 for every cycle. For example, if one wanted to increase the percentage of time to a 25% duty cycle one would push button 81 until the display shows 25. The controller 78 would then have a 25% on time for each cycle. Thus, through a process of manual setting the percentage of on time (duty cycle) of controller 78 one can increase or decrease the amount of dispensable material released into the body of water.

In operation system 70 includes an electrically operated valve 72, such as a solenoid valve, that is responsive to the first signal, which can open the valve, and the second signal, which can close the valve, to thereby dispense a water characteristic affecting material into a body of water in response to the relation of the on time of the first signal and the off time of the second signal to thereby either maintain or change the water characteristic of the body of water.

Thus system 70 comprise a water characteristic control system that can be operated independent of operator controls on a body of water with the control of the dispensing in the body of water determinable by controlling the percentage of on time in a duty cycle of a pulse width modulated signal.

System 70 as shown in FIG. 4 is useable as an after market system that can be quickly added to an existing system by merely splicing the line 76 with dispenser 74 into a circulating fluid line in a body of water.

Thus the system 70 includes the method of maintaining a water characteristic in a body of water, such as a spa, over a period of time by dispensing a water characteristic affecting material 18 into the body of water 12; and regularly interrupting the dispensing of the water characteristic affecting material 18 into the body of water during the period of time to thereby maintain the water characteristic of the body of water by limiting when an amount of the water characteristic affecting material is dispensed into the body of water during the period of time. Additionally, if desired one can suspending the step of regularly interrupting the dispensing of the water characteristic affecting material to accommodate extra use of the spa.

Figure 5:
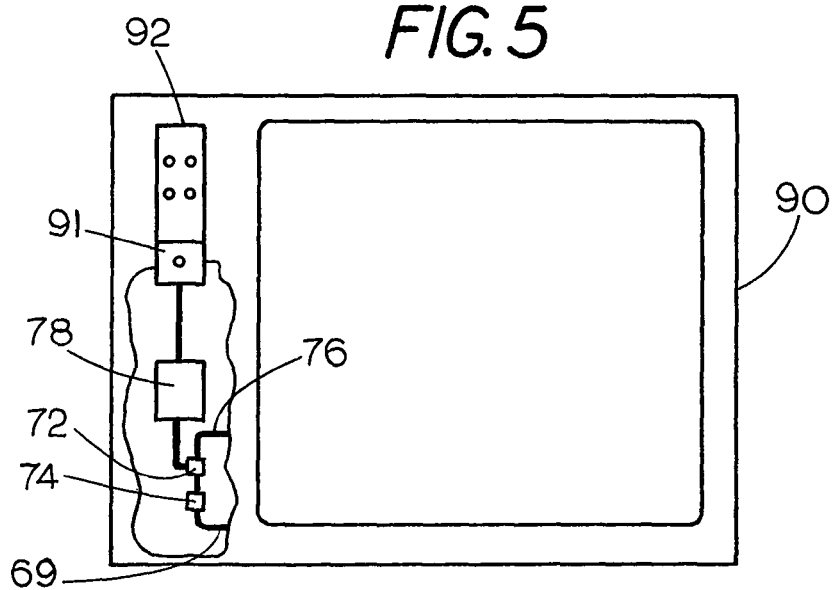
FIG. 5 is a top view of a spa partially in section revealing the control system with a display integrated with the display of the sap.

FIG. 5 is a top view of a spa 90 partially in section revealing the water characteristic controller 78 with a control module comprising display 91 integrated with the display and control panel 92 of the spa 90. In this embodiment the manual controls 81, 82, 83, 84 85, 86, 87, as shown in FIG. 4, have been integrated into the control panel 92 thereby providing a single location for the spa controls as well as the water characteristic controls. While all the controls of system 71 can be integrated if desired more or less controls could be integrated into display 71. While the system is shown with spa controls it is envisioned that other types of fluid systems requiring control of the fluid characteristic of the system can also be used with the system of FIG. 4.

Figure 6:
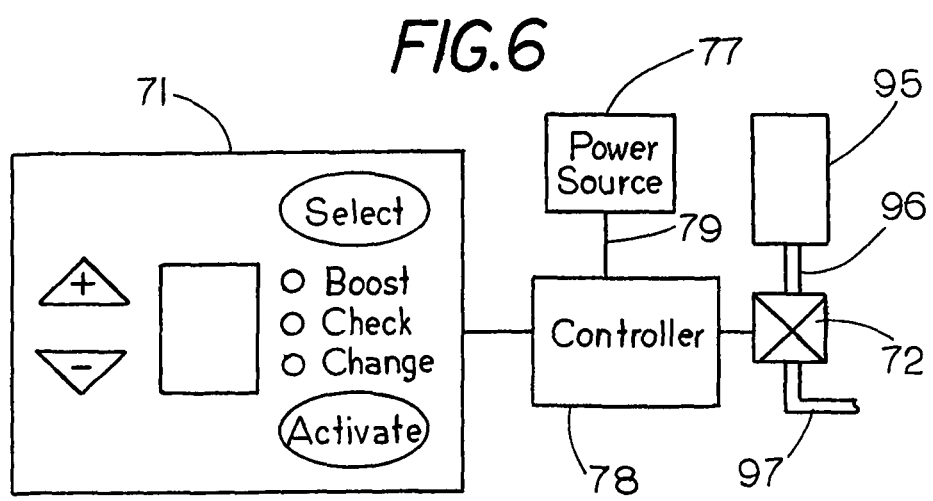
FIG. 6 is a diagram of a control system with a stand-alone display and a valve that opens a container carrying a water characteristic material.

FIG. 6 is a diagram of a control system with a the control module 71 comprising a stand-alone display and a valve 72 that opens and closes a pipeline 96 from a source of a water characteristic affecting material that can be added to the body of water to change the water characteristic of the body of water. The dispenser 95 can carry a water-characteristic affecting material such as a pH adjusting material that is periodically released through pipeline 96 when the valve 72 is in an open condition. In this embodiment the water characteristic affecting material is released directly into the fluid line without having water flow through a water characteristic affecting material in the dispenser 95. Thus a further feature of the invention is a control system that is responsive to either a stand alone display or to a control display such as a spa display control where the control of the dispensing of the water characteristic affecting material is integrated with the control display for a body of contained water.

Thus FIG. 4 shows a system 70 for cyclical control of a water characteristic in a body of water with or without feedback comprising a cyclic controller 78 responsive to controls on either a stand alone display 71 or controls on a spa display 92, a cyclic controller 78 repeatedly generating a cyclic output signal having a first signal and a second signal with the first signal different than the second signal and a valve 72 responsive to the first signal and the second signal to periodically open to dispense a water characteristic affecting material into a body of water in response to the on time of the cycle to thereby either maintain or change the water characteristic of the body of water.

Thus, the systems of the present invention provides low cost easy to use systems that are consumer friendly and can be used in an in home spa or swimming pool or the like and in one embodiment includes a system for cyclical time control of a water characteristic affecting material comprising a dispensable material deliverable to a body of water; a valve 17 or 72 having a first valve open condition and a second condition; and a controller 13 or 78 repeatedly generating a control signal with a fixed time period P with a portion "t" of the fixed time period P comprising a valve open signal to allow water to flow through the dispensable material and a remaining portion "$t_o$" of the fixed time period P comprising a valve close signal to decrease flow through the dispensable material during the remaining portion of the fixed time period.

In another embodiment the invention comprises a system 10 for cyclical control of a water characteristic without feedback comprising: a body of water 12; a circulation line 16, 21 to and from the body of water; a dispenser 19 located in the circulation line; a dispensable material located in the dispenser 19; a pump 15 for directing water into the circulation line; a valve 17 having an open condition to allow water to flow through the circulation line and a closed condition to prevent water from flowing through the circulation line; and a controller 13 that repeatedly generates a signal having a fixed time period P with a portion "t" of the fixed time period comprising a valve open signal to open the valve 17 to allow water to flow through the dispenser and a remaining portion "$t_o$" of the fixed time period P comprising a valve close signal to close the valve 17 to prevent water from flowing through the dispenser 20 to thereby periodically limit the dispensing of the dispensable material into the body of water. A further aspect of the invention is the method of maintaining a water characteristic in a body of water over a period of time by dispensing a water characteristic affecting material into the body of water and regularly interrupting the dispensing of the water characteristic affecting material into the body of water during the period of time to thereby maintain the water characteristic of the body of water by limiting when an amount of the water characteristic affecting material is dispensed into the body of water during the period of time.

It is apparent that with the invention described herein one can provide a cyclical method of day-to-day controlling a characteristic of a body of water. In addition, when the controls are integrated into the spa control pad as described herein the consumer needs only one control pad to control the spa functions as well as the water characteristics of the water in the spa. While examples of water characteristic affecting material have been described herein it is understood that the invention can be used with other materials that are dispensable.

While the invention herein has been described in cyclical control of recreational bodies of water the system is also suitable for use in other systems, for example jetted bathtubs, foot baths for pedicures and for sanitation of water in recreational vehicles including yachts, boats and the like.

Figure 7:
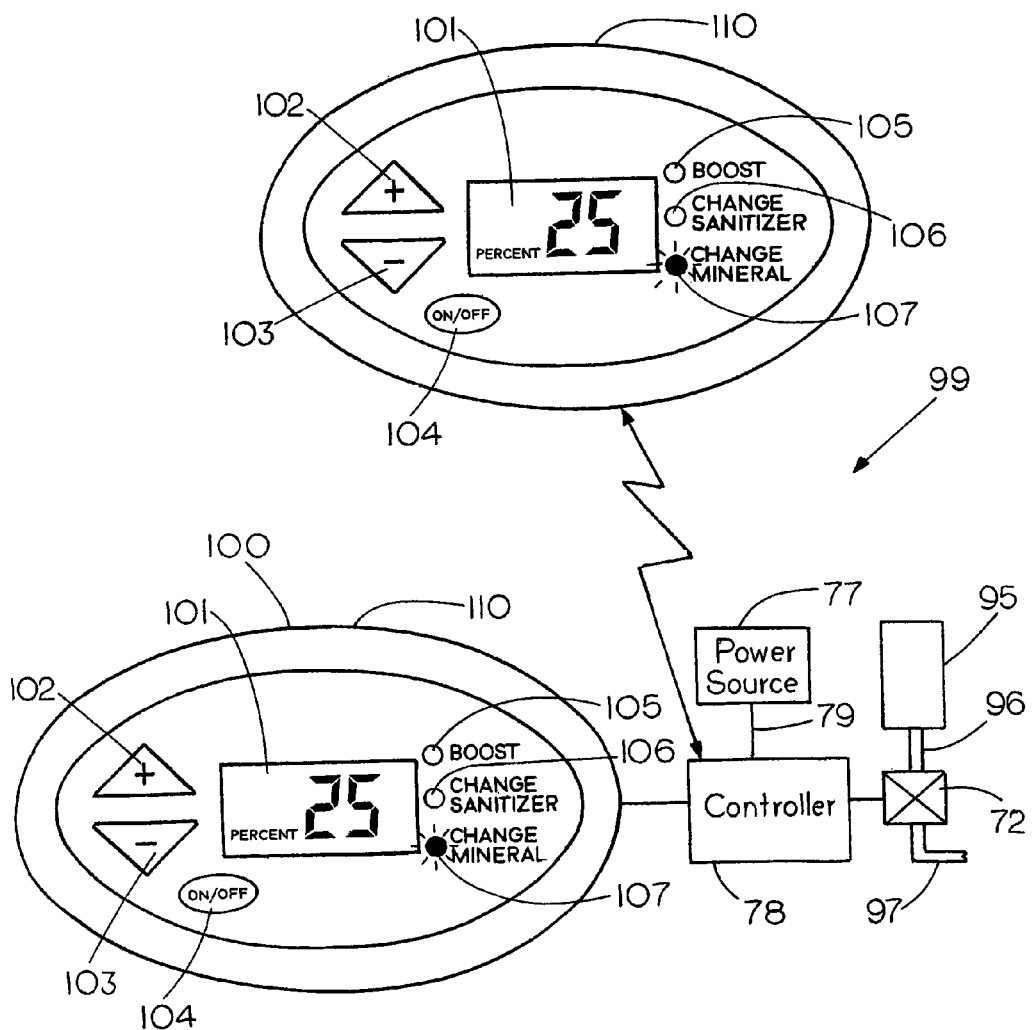
FIG. 7 is shows a dual mode spa control system with a first control module hard wired into the control system and a second remote control module in wireless or RF communication with the control system.

FIG. 7 illustrates a dual mode spa control system 99 with a stand-alone control module 100 and a RF or wireless remote control module 110. The control system 99 includes a control unit 78 that can receive signals from either of the control modules 100 or 110 and can generate a signal to open and close a valve 72 in response to a signal from either control module 100 or remote control module 110. Remote control module 110 is wireless while control module 100 can either be either hard-wired or wireless. A control signal from either module can open and close a pipeline 96 from a source of a water characteristic affecting material in dispenser 95 thus allowing more or less water characteristics affecting material to be added to the body of water in the spa to change the water characteristic of the body of water in the spa. For example, the dispenser 95 can carry a water-characteristic affecting material such as a sanitizer or minerals that are periodically released through pipeline 96 when the valve 72 is in an open condition. In the example shown in FIG. 7 the water characteristic affecting material in dispenser 95 is released directly into the fluid line 97 without having water flow through the water characteristic affecting material in dispenser 95. Other methods of releasing water characteristic affecting materials into the spa may be used, for example, directing water through the water characteristics affecting material in the dispenser. Control module 100 and control module 110 are shown with identical or substantially identical display faces so that either control module can be controlled and operated in the same manner. While control modules are shown with the same or identical display faces in some instance one may want to have control modules with different display faces.

In the system of FIG. 7 the first control module 100, which is mounted on or at the spa and preferable as part of the spa display, includes a viewing screen 101, a + button 102 for increasing a signal and a − button 103 for decreasing a signal with the buttons positioned left of viewing screen 101. A set of visual indicators, such as led lights, 105, 106 and 107 are positioned to the right of viewing screen 101 with each of the led lights representing different modes. For example, led light 105 represents a "boost" mode led light 106 represents "change sanitizer" mode, and led light 107 represents "change mineral" mode. In the mode shown, a "change mineral" signal could be used to change the on time of the dispensing cycle. The "boost" mode may be used to change the water characteristics by temporarily overriding the dispensing cycle. Likewise in the "change sanitizer" mode information is provided to the user on the time left before the sanitizer minerals need replenishing. While 3 separate items of information are viewable on screen 101 more or less items of information could be viewed or controlled with either or both of the control modules. Also other features that do not necessarily relate to the spa may be desired to included in either or both control module 100 and 110.

In operating of the control module 100, which is mounted as part of the display system on the spa, the amount of percentage of on time of the duty cycle can be increased or decrease by use of the + button 102 and the − button 103. FIG. 7 shows the fractional on time of the duty cycle illustrated in FIG. 2 is 25%. For example, in the increase mineral mode (led 107 illuminated) shown in FIG. 7, to increase the percentage of on time of the duty cycle one would push on + button 102 and to decrease the percentage of on time on the duty cycle one would push on the − button 103. Thus with control module 100 one can increase or decrease the fractional on time of the duty cycle.

FIG. 7 shows a second control module 110 which has a viewing face that is identical or substantially identical to the viewing face of control module 100. Control module 100 communicates directly with controller 78 and control module 110 is wireless and communicates with controller 78 through radio frequencies. That is control module 110 comprises a transceiver that can both transmit and receive information from the control unit 78. A feature of the dual control module system shown in FIG. 7 is that the various spa features can either be controlled either at the spa or can be remotely controlled through the hand held control module 110.

The control modules are preferable linked to each other so that a change of the display 101 on one of the modules is also reflected in a change of the display 101 on the other module. However, if desired one may want to delink the control modules or inactive one or the other. For example, one may want to deactivate the spa control module 100 to if the persons in the spa are not familiar with the controls and could accidentally change settings to an improper setting.

Figure 8:
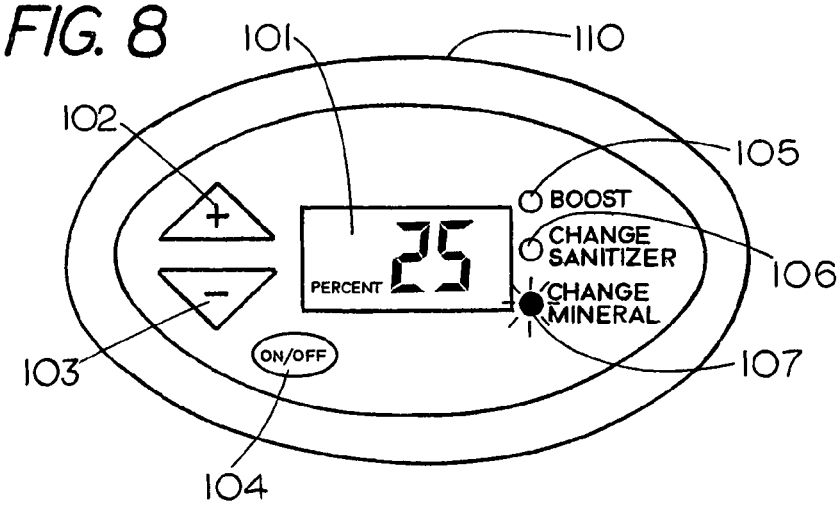
FIG. 8 shows a control module in a first mode.
Figure 9:
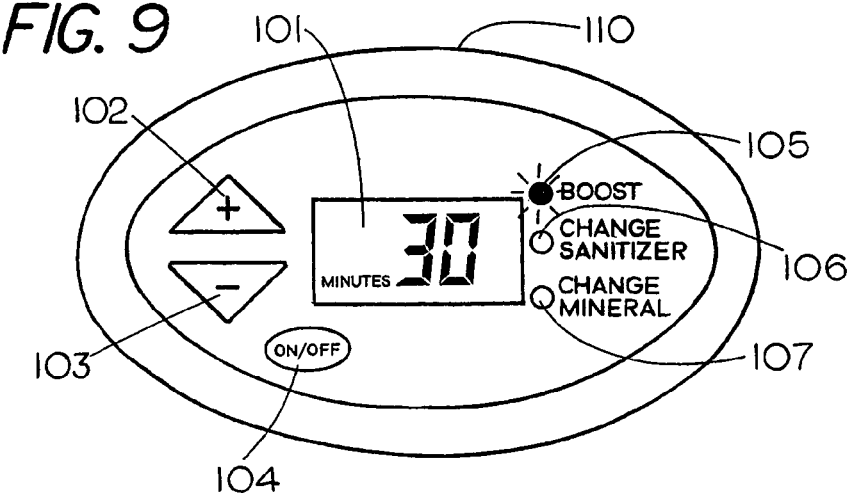
FIG. 9 shows the control module of FIG. 8 in a second mode.
Figure 10:
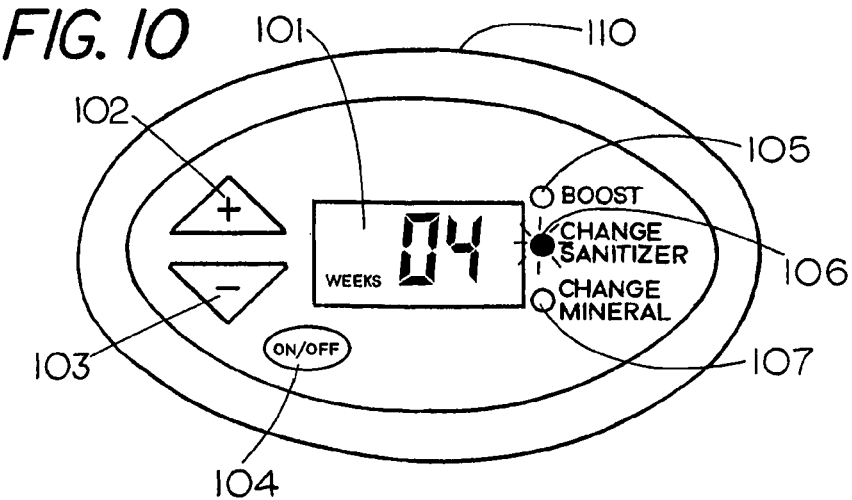
FIG. 10 shows the control module of FIG. 8 in a third mode.

To illustrate how three different items of information can be monitored and controlled by the system 99 reference should be made to FIG. 8, FIG. 9 and FIG. 10 which show the control module 101 in three different modes. FIG. 8 shows the control module in the mode for changing the amount of minerals that are dispensed, that is the "change mineral" light 107 is on the on position. The setting shown is 25 percent as indicated on viewing screen 104. The percent, which is percentage of on time during the duty cycle, can be increased or decreased by using the + button 102 to increase the percentage of on time and the – button 103 to decrease the percentage of on time. Once the percentage is selected one may toggle to another mode and another screen by pushing on the button 104.

FIG. 9 shows the identical control module 110 when the mode and screen is changed to the "boost" mode as indicated by the illumination of led 105. To arrive at the screen that shows the boost one can merely push on the button 104 until the boost light is on. The viewing screen 101 then shows that a boost will occur for 30 minutes. If desired the boost time could be increased or decreased by using the + button 102 and the – button 103. Once the length of the boost mode is selected one can toggle to another mode and another screen by pushing on button 104.

FIG. 10 shows the control module 110 in the information mode or "change sanitizer" mode where the length of time before changing the sanitizer is shown on screen 101. In the example shown screen 101 indicates that the sanitizer needs to be changed in 4 weeks.

As viewed in FIG. 7 the on/off time of the system 99 can be controlled by a control module 100 at or incorporated as part of the spa display or the system can be controlled or monitored remote from the spa through a remote control module 110. In the example shown the viewing face of the controls on the control module on the spa display and the viewing face of the control module 110 which is remote from the spa are identical to avoid confusion; however, if desired the display faces may include differences.

Thus a further feature of the invention is a control system that is responsive to either a single control module, or two or more control modules with the system controllable from either the spa or proximate to the spa or both. While the system is shown in conjunction with a spa system it is envisioned that others may use the control system in other systems that control recreation or drinking water.

Figure 11:
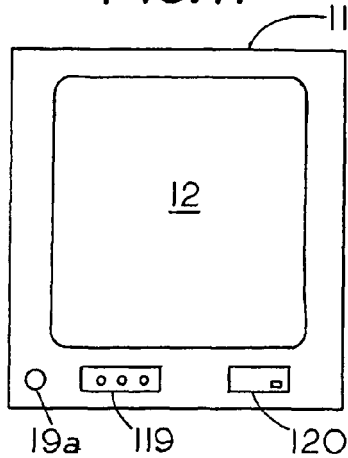
FIG. 11 shows a top view of the spa of FIG. 1.

FIG. 11 is a top view of a container 11, which may for example be a spa, with a body of water 12 located therein. Located on a top face of container 11 is a set of conventional spa controls 119 for controlling the operation of the spa features such as water temperature or water jets. Positioned proximate to spa controls 119 is interactive sanitizer controller/display pad 120 having a viewing panel that supplies visual information on when the sanitizing dispensers need to be replaced as well as the dispersant rate of the timer based control system. In addition, the sanitizer control/display pad 120 includes a manual control to allow a user to select a dispersant rate without having to remove a sanitizer dispenser and manually adjust the openings in the sanitizing dispenser.

Figure 12:
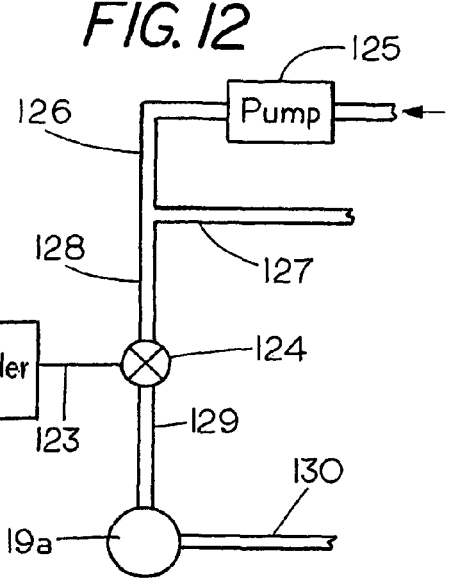
FIG. 12 shows a partial view of the interactive sanitizer controller/display pad and a controller and fluid line.

FIG. 12 shows the interactive sanitizer controller/display pad 120 and the controller 122 for controlling the dispensing of two sanitizers into the body of water 12. Spa 11 includes a pump 125 that draws water 12 from the spa and directs the water into a pipe 126 where a portion of the water flows though a pipe 128 and a remaining portion of water discharges into the spa through a pipe 127. A solenoid operate valve 124, which is responsive to controller 122, is located between pipe 128 and 129. When solenoid valve 124 is in the open position water flows through pipe 129 and through a dispenser or dispensers located below dispenser container cap 19*a*. (Examples of dispensers are shown in FIG. 1) After flowing through the dispensers the water with the sanitizing dispersants therein then flows back into the body of water through a pipe 130. When solenoid valve 124 is in the closed position the water is blocked from flowing though valve 124 and hence blocked from flowing through the sanitizing dispensers. While a solenoid valve is shown is should be understood that other types of valves or flow devices may be used which can periodically shut off or permit sanitizer dispensing. Thus the amount of sanitizing dispersant is controlled or limited by the time that the sanitizers are in an open position for dispensing sanitizers.

In the system shown the solenoid valve 124 connects to a solenoid valve controller 122 through lead 123 and to the interactive sanitizer controller/display pad 120 through a lead 121. The operation of the controller 122 is similar to controller 13 with the interactive sanitizer controller/display pad 120 enabling an operate to visually receive information on the remaining life of the sanitizers as well as to quickly initiate spa startup though adjustment of the flow of water through internal dispensers without having to removing the dispensers from the dispenser holder to resize the openings in the dispensers.

Figure 13:
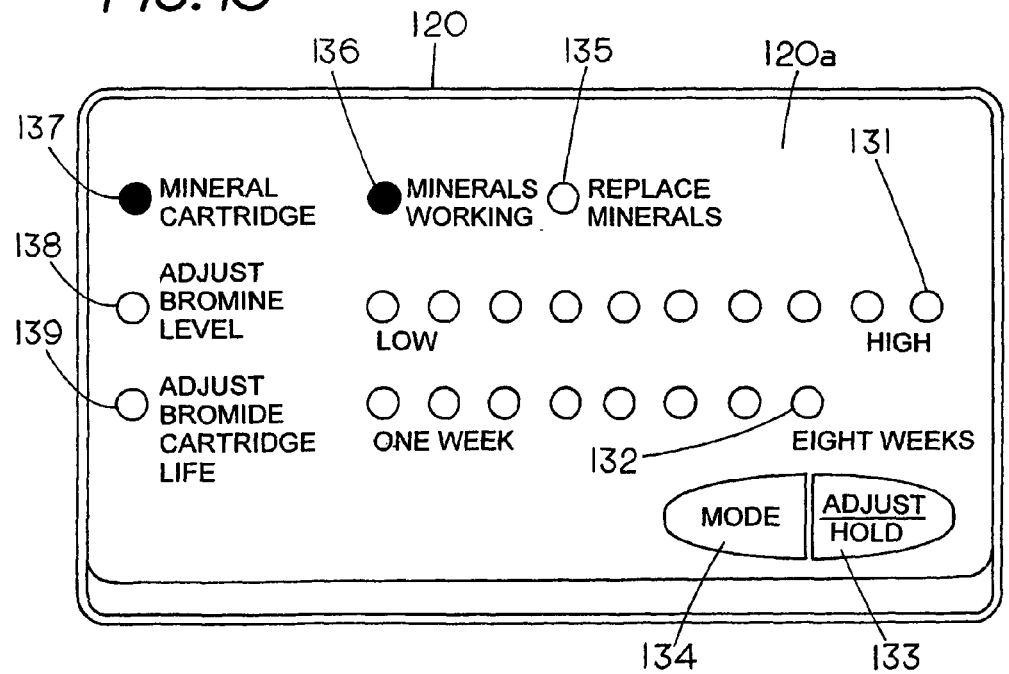
FIG. 13 shows an isolated view of the interactive sanitizer controller/display pad in a first mode.

FIG. 13 shows the interactive sanitizer controller/display pad 120 having a viewing panel 120*a* with three lines of information lights for use with a control system, for example, a timer based control system where one, two or more dispersants may be simultaneously dispensed into the body of water 12 by controlling the flow of water through two sanitizing dispensers which are located in a fluid line. Although the system discloses the control of dispersant of sanitizers by controlling the flow of water through two inline sanitizing dispensers alternately one may control the direct dispensing of sanitizers into the water through sanitizing dispensers which are isolated from each other. Similarly, instead of controlling the flow of water one may wish to control the dispensing of a dispersant from a sanitizer.

The first horizontal line of information lights 137 may typically alert an operator to whether a first sanitizer dispenser is working or if the sanitizing dispenser is spent and needs to be replaced. The first sanitizer dispenser typically may be a sanitizing dispenser that delivers a sanitizer such as metal ions which may include but not limited to silver ions, copper ions or zinc ions or combinations thereof as water flows through the first sanitizer dispenser. Typically, the first sanitizer dispenser has a known fixed dispensing life which is based on the amount of sanitizing materials present in the sanitizer dispenser and the size of the body of water. For example, the first sanitizing dispenser may contain minerals that maintain a biocidal effective level of heavy metal ions such as a silver ion in a body of water for a period of 4 to 6 months. With the knowledge that the first sanitizing dispenser will last for a given period the first line of visual information can be simplified to indicate that either the first sanitizing dispenser is working (light 136 illuminated) or that the first sanitizing dispenser needs to be replaced (light 135 illuminated) based on elapsed time from installation of the dispenser in the system.

The second horizontal line of lights 138 provides visual information on a selected dispersant rate of a second sanitizer dispenser such as a halogen dispenser, which typically may include a halogen such as either bromine or chlorine. As the amount of halogen sanitizer in the body of water will vary with a number of variables including the load in the spa, i.e. the number of people and the length of use of the spa one may need to determine a normal setting for the spa and set the dispensing rate to accommodate the normal spa operating condition.

Figure 13A:
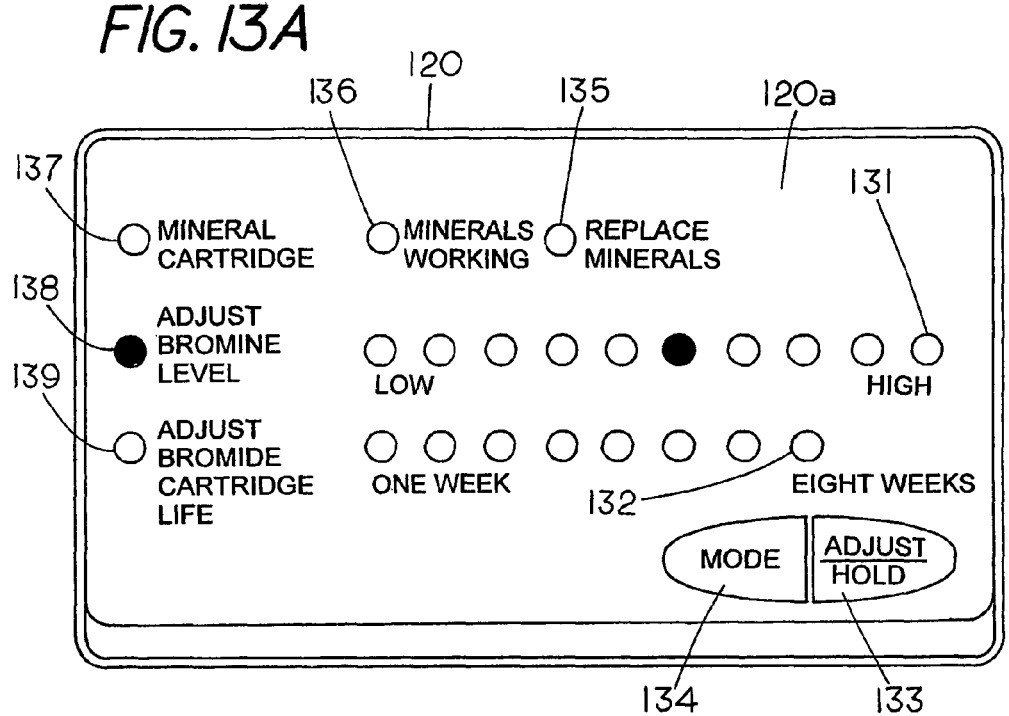
FIG. 13A shows an isolated view of the interactive sanitizer controller/display pad in a second mode.
Figure 13B:
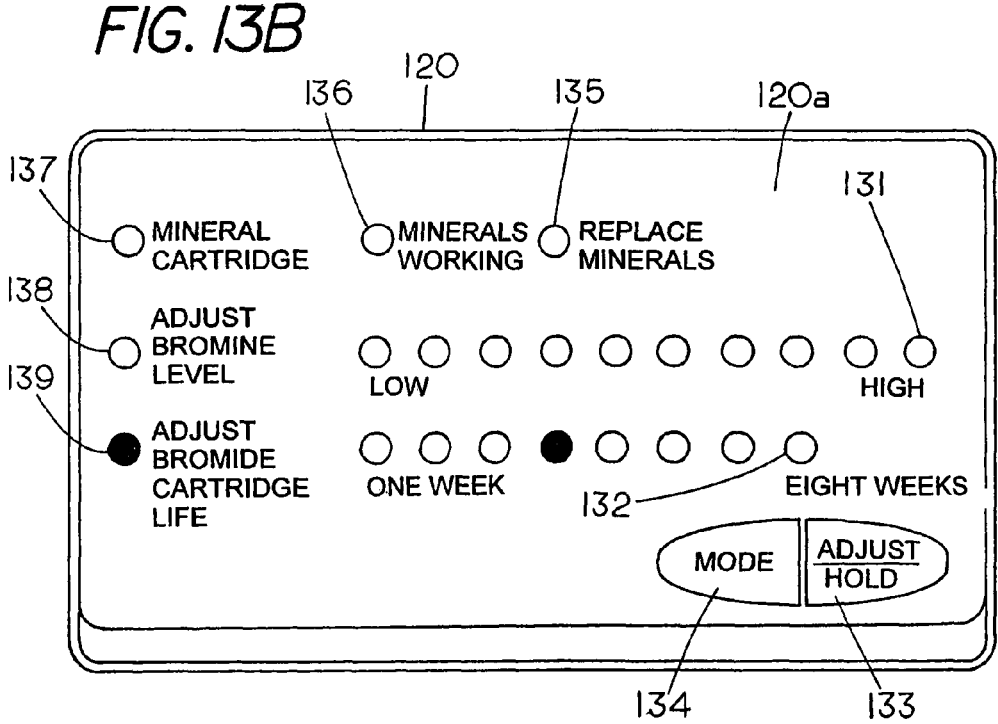
FIG. 13B shows an isolated view of the interactive sanitizer controller/display pad in a third mode.

Sanitizer controller/display pad 120 allows an operator to manually select and change a dispensing rate through a set of manual controls 133 and 134 which are located on the viewing panel 120*a*. For example, the operator manually touches mode control 134, which connects to controller 122, until the first light in the second line of horizontal lights is illuminated, which is shown in FIG. 13*a* (adjust bromine level light illuminated) thus indicating controller 122 is in the mode to allow an operator to adjust the bromine dispensing rate. Once controller 122 is in the adjust bromine level mode a dispensing rate for the second sanitizing dispenser can be selected through manual switch 133 which sends a signal to controller 122. For example, pushing the manual switch 133 illuminates one light in the second row and pushing the manual switch 133 a second time illuminates the next light and shuts off the first light. Similarly, pushing the switch a third time illuminates a third light and shuts off the second light. With each change in position of the illuminated light corresponding to a change in the dispensing rate of the bromine into the spa and hence the level of bromine that will be maintained in the spa. The row of lights allows an operator to visually observe the change in the rate of sanitizer dispensing through the position of the illuminated lights in the second horizontal row of lights. That is, as the position of the light moves to the right the rate of dispensing of sanitizer increases and as the position of the light moves to the left the rate of dispensing of sanitizer decreases.

Mode control 134 may include a second feature, namely, a spa size selector that enables one to more quickly select the proper dispensing rate for a spa by enabling the user to select startup conditions based on spa size since the amount of halogen required in the spa is partly determined by the volume of the spa. The spa size selector feature can reduce the time for a user to arrive at the proper dispensing rate for the spa. For example, by grouping spas into three sizes, namely, spas holding under 250 gallons of water, spas holding between 250 to 350 gallons of and spas holding between 350 and 500 gallons of water reduces the amount of time necessary to establish the proper dispensing rate of halogen into the spa since it reduces the workable range of dispensing rates for the sanitizers. Consequently, one minimizes operator trial and error in selecting the proper dispensing rate for the spa.

While in the above example spas have been grouped into three size spas for use with the spa selector feature it should be understood that spas may segregated into more or less groups if desired. For example, if the spa holds less than 250 gallons of water the operator can initiate start up by holding down control 134 for a fixed period of time, for example, five seconds and for a spa between 250 and 350 gallons the operator holds down control 134 a second fixed period of time for example five seconds and for spas between 350 and 500 gallons the operator holds down control 134 a third time for a fixed period of time for example five seconds. In each case controller 122 limits the range of the rate of dispensing of sanitizers to those ranges of dispensing rates which have been found to be effective with spas of similar sizes. Thus, a feature of the system that it more quickly allows an operator to determine the proper sanitizer dispensing rate by eliminating dispensing rates that are inappropriate for a given size spa.

When a halogen dispenser such as a bromine dispenser or bromine is placed in the spa the user selects a dispensing rate based on the normal load on the spa by pushing on switch 133 which, for example, can be used to change the fractional on time of the cycle of a time based control system. Pushing on switch 133 cause the light to move along the second row of lights. In the example shown if the light is on the left side of the second row of lights the dispensing rate is low and if the light in on the right side of the second row of lights the dispensing rate is high. Once the dispensing rate is selected one can measure the level of bromine in the spa. Typically, one waits until the next day to measure the level of bromine in the spa. If the level of bromine in the spa is low one can activate mode switch 134 and through switch 133 increase the dispersant rate of the bromine. Similarly, if the level of bromine in the spa is high one can manually active switch 134 and through switch 133 decrease the dispersant rate of the bromine. Once the proper level of bromine in the spa is obtained the controls can remain fixed.

After selecting the proper dispensing rate the user pushes on switch 134 which can illuminate the first light in the third row of lights. The user then sets the reminder for replacing the halogen dispenser. For example, if the halogen dispenser is expected to last eight weeks the switch 133 is pushed until the eighth light in line three is illuminated. The position of the illuminated light in the third row of lights will change depending on elapsed time. That is, as each week passes the position of the illuminated light in line 3 moves toward the left which alerts the operator to the remaining time to replace the halogen dispenser.

As described herein the sanitizer controller/display pad 120 provides a user with a method of more quickly maintaining or adjusting a biocidal effective level of a sanitizer in a water system without a costly and complicated feedback control system thus making it suitable for adapting to existing delivery systems. The method includes placing a halogen dispenser in communication with the body of water; setting a dispensing rate of a halogen by illuminating a light in a row of lights that corresponds to a dispensing rate for dispensing the halogen from the halogen dispenser into the body of water; measuring the level of the halogen in the water system to determine if the measured level of the halogen corresponds to an effective kill level of the halogen in the water system; and if necessary, increasing or decreasing the dispensing rate of the halogen by illuminating a different light on the light display until an effective kill level of the halogen in the water system water is obtained.

We claim:

1. A method of maintaining or adjusting a sanitizing dispensing rate in a water system comprising:
   placing a sanitizer dispenser in a fluid dispensing line;
   setting a dispensing rate of a sanitizer by illuminating a light in a row of lights that corresponds to a dispensing rate for dispensing a sanitizer from sanitizer dispenser into the fluid dispensing line;

measuring the level of the sanitizer in the water system to determine if the measured level of the sanitizer corresponds to an effective kill level of the sanitizer in the water system;

if necessary, increase or decrease the dispensing rate of the sanitizer by illuminating a different light in the row of lights until an effective kill level of sanitizer in the water system water is obtained.

2. The method of claim 1 wherein the sanitizer dispenser comprises a halogen dispenser containing bromine and the water system comprises a timer based spa water system having a dispensing cycle that can be changed to increase or decrease the dispensing rate.

3. The method of claim 1 wherein the sanitizer comprises a halogen and the measuring of the level of the halogen in the water system occurs in a day following the setting of a dispensing rate of the halogen.

4. The method of claim 1 where setting the dispensing rate of the sanitizer is indicated by the position of an illuminated light or a number of illuminated lights in a row of lights.

5. The method of claim 1 including indicating the dispensing life of the sanitizer by a position of an illuminated light or by a number of illuminated lights in a further row of lights.

6. The method of claim 1 including decreasing the range of dispensing rate by selecting a volume level of the body of water before setting a dispensing rate.

7. The method of claim 1 including placing a mineral dispenser containing a silver ion donor in the dispensing line with the sanitizer dispenser and illuminating a light in the light display that corresponds with a dispensing life of the mineral dispenser.

8. The method of claim 1 wherein setting a dispensing rate of a sanitizer in a light display corresponds to selecting a dispensing cycle with a fractional on time with the dispensing cycle and the fractional on time determined by an operator.

9. The method of claim 1 wherein a mineral dispenser is placed in the fluid dispensing line with the sanitizer dispenser containing a halogen to permit simultaneous on off dispensing of both a halogen and a mineral.

10. A timer based water system comprising:
    a controller for generating a dispensing cycle having a fractional on time;
    a controller/display pad having a viewing panel;
    a row of illuminable lights on the viewing panel for indicating a dispensing rate of a sanitizer; and
    a switch on said control display pad, to allow an operator to change the dispensing rate of sanitizer in the spa by increasing or decreasing either a length of the dispensing cycle or a fractional on time of the dispensing cycle or both.

11. The timer based water system of claim 10 wherein the system connects to a spa and the spa includes a mineral dispenser with the controller/display pad including a further row of illuminable lights on the viewing panel for indicating the life of a mineral dispenser.

12. The timer based water system of claim 11 including an additional row of illuminable lights for indicating the remaining life of the sanitizer.

13. The timer based water system of claim 10 wherein the dispensing rate can only be changed by an operator interacting with the switch.

14. An interactive sanitizer controller/display pad for a body of recreational water comprising:
    a light for indicating when a sanitizing dispenser needs replacement;
    a row of lights for indicating a sanitizer dispensing rate by a position of an illuminated light in the row of lights; and
    a switch to enable an operator to manually illuminate a selected light in the row of lights to select a sanitizer dispensing rate in a controller.

15. The interactive sanitizer controller/display pad of claim 14 wherein the body of recreational water is located in a spa and the controller cycles a valve between an open position and a closed position independent of the variation of the level of sanitizer in the spa.

16. The interactive sanitizer controller/display pad of claim 15 for limiting a range of dispensing rates based on the size of spa.

17. The interactive sanitizer controller/display pad of claim 16 wherein the interactive sanitizer controller/display pad is separate from a spa control panel.

18. The interactive sanitizer controller/display pad of claim 15 wherein each of the row of lights on the interactive sanitizer controller/display pad comprise the sole visual indication of the operating status of the spa dispensing system.

19. The interactive sanitizer controller/display pad of claim 14 wherein an operator manually selects either the length of a dispensing cycle or a fractional on time or both through finger interaction with the switch.

20. The interactive sanitizer controller/display pad of claim 14 including a visual alert for indicating when a sanitizer dispenser needs replacement.

* * * * *